L. W. & C. OLDS.
Link for Connecting the Handles and Pitmen of Pumps
No. 6,543. Reissued July 13, 1875.
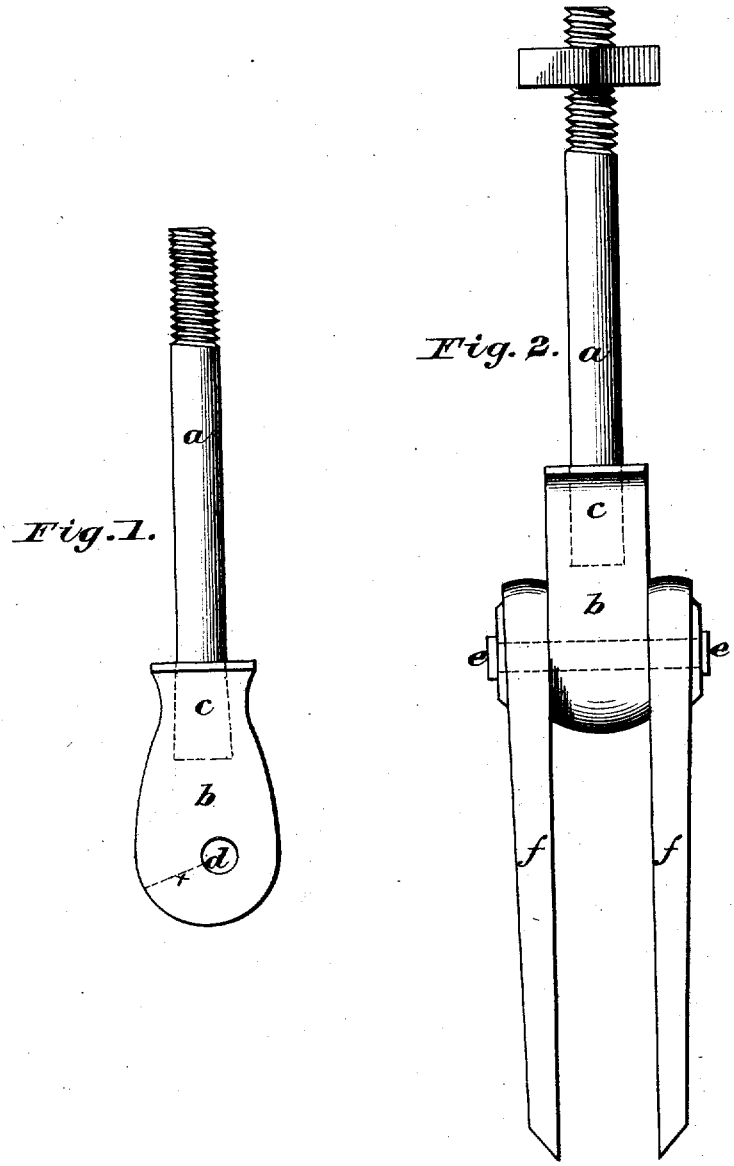
Witnesses:
Jno K Hallock.
W. R. Stearns.
Inventor
Lewis W Olds
Clark. Olds.
N. PETERS, PHOTO-LITHOGRAPHER, WASHINGTON, D. C.

UNITED STATES PATENT OFFICE.

LEWIS W. OLDS AND CLARK OLDS, OF ERIE, PENNSYLVANIA.

IMPROVEMENT IN LINKS FOR CONNECTING THE HANDLES AND PITMEN OF PUMPS.

Specification forming part of Letters Patent No. 130,527, dated August 13, 1872; reissue No. 6,543, dated July 13, 1875; application filed December 17, 1874.

*To all whom it may concern:*

Be it known that we, LEWIS W. OLDS and CLARK OLDS, of Erie, in the county of Erie and State of Pennsylvania, have invented an Improvement in Links Connecting the Handles and Pitmen of Pumps, of which the following is a specification:

The nature of our invention consists in providing a connecting-link for pumps, which shall be so constructed that it will embody strength, durability, and cheapness of construction.

Our invention is shown in the accompanying drawings, as follows: Figure 1 is a view of a link, and Fig. 2 is a view of the link, together with the side straps, which are connected with the piston-rod of the pump, and also the attaching-rivet.

The link proper, as shown in the accompanying drawing, is composed of two parts, *a* and *b*, of which *b* is the head, and *a* the bolt. The part *b* is cast upon the part *a*, and the two are formed together as one solid whole.

The construction of our link is as follows: The bolt *a*, after being slightly flattened at the head *c*, is laid in the mold, and the part *b* is cast about it. In the head *b* is left an eye, *d*, which may be placed eccentrically, that a greater heft of metal may be left on one side of it than on the other.

In Fig. 2, the letters *f f* represent the iron straps attached to the pitman-rod, and to these, and thus to the pitman-rod, is attached the link by the rivet *e*. The link is then attached to the handle by the part *a* passing through it, and being secured by the nut shown.

The object of thus constructing our device is as follows: It will be seen that in the operations of the pump great strain is brought against the part *a* of the link, and therefore we use a steel rod for that part. It will again be seen that by attaching the link to the straps *f f* by a loose rivet, as is done by us, the friction is distributed over the whole length of the rivet *e*, for, as stated, it is loose—that is, it is not made of sufficient size to fit tight in any of the parts.

We are aware that links having the form and appearance of ours have been constructed heretofore; but in place of the eye *d* in the head *b* a bolt is used, which is cast solid with the head, as is the part *a*. By that form of construction the friction all comes on the end of the bolt, which causes it to very soon wear away.

As before stated, our device distributes the friction, and hence does away with the objection just named. The eye *d* is placed eccentrically, for the purpose of giving a greater body of metal in the head *b* in the direction in which the eye will become worn by use. (See dotted line *x*, Fig. 1.) We do not claim the casting of one metal upon any other, nor do we claim the use of any particular metal for any given purpose.

Our invention relates to the precise article of manufacture we produce, the peculiarities of which are, as particularly shown and described, the adaptation and arrangement of the different parts thereof with reference to the wear or strain upon them, the assignment of the appropriate metals to the special uses and requirements of the parts, and the connection of these parts together to form the whole, which we have minutely described; therefore

What we claim as our invention is as follows:

1. The part *b*, having an eye, *d*, and cast upon the part *a*, as shown, and for the purposes mentioned.

2. The parts *a b*, with the eye *d* placed therein, in the manner and for the purposes shown.

LEWIS W. OLDS.
CLARK OLDS.

Witnesses:
JNO. K. HALLOCK,
W. R. STEARNS.